United States Patent [19]

Graham

[11] Patent Number: 4,722,575
[45] Date of Patent: Feb. 2, 1988

[54] MECHANICAL EMERGENCY AND PARKING BRAKE SYSTEM

[76] Inventor: John M. Graham, 820 N. Delaware, Apt. 308, San Mateo, Calif. 94401

[21] Appl. No.: 28,812

[22] Filed: Mar. 20, 1987

[51] Int. Cl.[4] .................. F16D 65/24; B60T 13/22
[52] U.S. Cl. ............................ 303/2; 188/106 F; 188/170; 303/10; 303/71
[58] Field of Search .................. 303/2-3, 303/6 M, 9, 71, 10-12, 28, 13; 188/170, 106; 137/116, 493

[56] References Cited

U.S. PATENT DOCUMENTS

| | | | |
|---|---|---|---|
| 2,899,025 | 8/1959 | Marosi | 188/170 |
| 3,425,221 | 2/1969 | Canfield | 60/54.5 |
| 3,985,210 | 10/1976 | Hodge et al. | 188/170 |
| 4,072,360 | 2/1978 | Carroll et al. | 303/2 |
| 4,407,548 | 10/1983 | Graham | 303/6 M |
| 4,440,189 | 4/1984 | Graham | 137/116 |
| 4,576,418 | 3/1986 | Holzinger et al. | 303/71 |

*Primary Examiner*—Douglas C. Butler
*Attorney, Agent, or Firm*—Townsend and Townsend

[57] ABSTRACT

A mechanical emergency and parking brake system, for vehicles of the type having a power steering pump, includes a check valve having an input port coupled to the pump outlet and an output port coupled to hydraulically deactuated spring brakes through brake lines. A pilot check valve has its inlet port coupled to the input port of the check valve and an output or return port coupled to the power steering gear. The pilot port of the pilot check valve is coupled to the output port of the check valve so that the pilot check valve opens only when the pressure at the output port of the check valve is above a chosen pressure. This allows hydraulic fluid to flow from the pump, through the pilot check valve, through the power steering gear and to the reservoir. To reapply the brakes, the operator actuates a valve which disconnects the brake ports from the output port of the check valve and connects the brake lines to the reservoir. This occurs when the operator wishes to set the brakes when stopped or in emergency situations. If desired, a pressure release valve can be fluidly connected to the output port of the check valve to limit the pressure at the output port.

18 Claims, 2 Drawing Figures

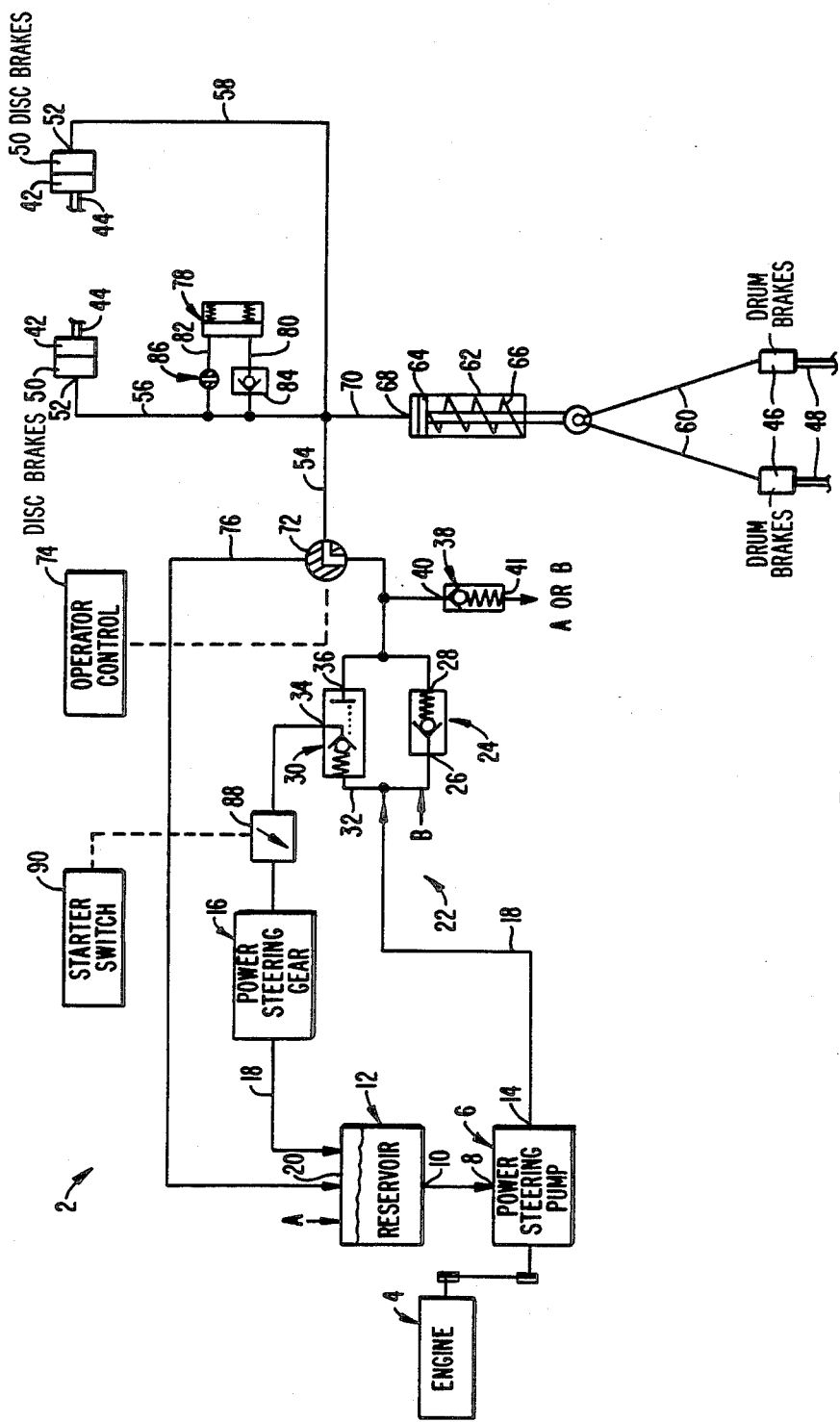
FIG._1.

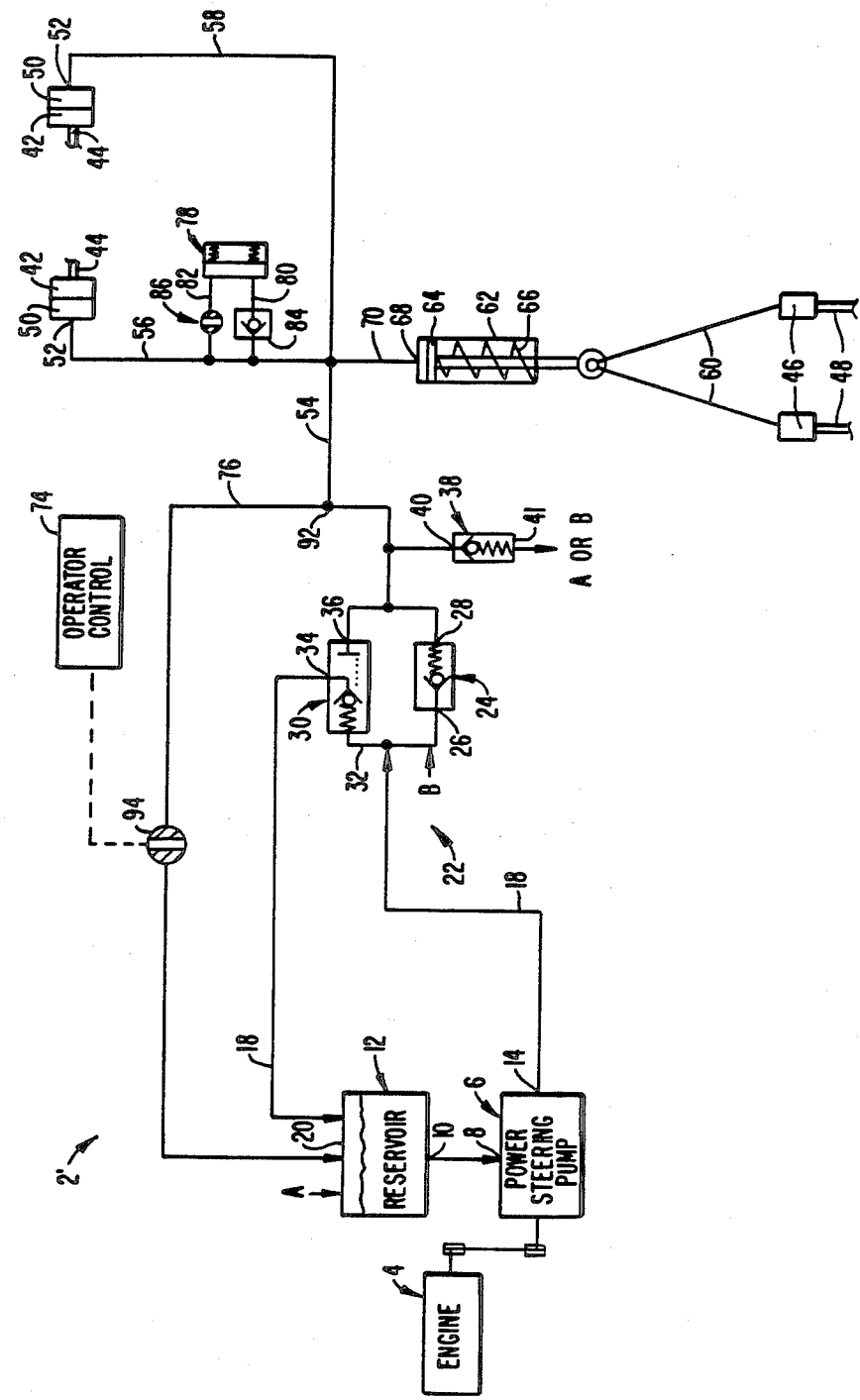
FIG._2.

MECHANICAL EMERGENCY AND PARKING BRAKE SYSTEM

BACKGROUND OF THE INVENTION

Automobiles and light trucks usually have hydraulic service brakes and cable actuated parking brakes. Parking brakes, by law, are restricted to the use of mechanical braking force. However, since conventional parking brakes can apply one about one tenth the braking force that hydraulically actuated service brakes can apply, there are often quite ineffective at stopping a vehicle during an emergency, such as when the service brakes fail while the vehicle is moving. The result of a service brake failure, or the failure of parking brakes such as when parked on a steep incline, is often catastrophic.

SUMMARY OF THE INVENTION

The present invention is directed to a mechanical emergency and parking brake system for vehicles using the vehicle's conventional power steering pump which requires minimal changes to the braking system.

One embodiment of the system includes a check valve having an input port coupled to the power steering pump outlet and an output port coupled to hydraulically deactuated, mechanically applied brakes. The brakes can be either disc type, drum type or both disc and drum types. A pilot check valve has its inlet port coupled to the input port of the check valve and a return port coupled to the power steering gear. The pilot port of the pilot check valve is coupled to the output port of the check valve; the pilot check valve opens, allowing fluid to flow through the pilot check valve, through the steering gear and back to the reservoir, only when the fluid pressure at the output port of the check valve is above a chosen pressure. This chosen pressure is sufficient to release the hydraulically deactuated, mechanically applied brakes.

To allow the brakes to be reapplied, the operator actuates a control valve which disconnects the emergency and parking brake lines, which are connected to the hydraulically deactuated mechanically applied brakes, from the output port of the check valve and connects them to the reservoir. Typically this occurs when the operator wishes to set the brakes when parked with the engine off. However, in emergency situations the operator can actuate the control valve to dump the fluid from the emergency and parking brake lines to the reservoir, thus applying the brakes, while the vehicle is in motion.

If desired, a pressure release valve can be fluidly connected to the output port of the check valve to limit the pressure at the output port. The pressure release valve can be connected in parallel with the check valve or, for example, it can be coupled directly to the reservoir.

In some circumstances it may be desirable to temporarily restrict the flow of hydraulically fluid passing from the pilot check valve, such as during the initial pressurization of the system. In such case a flow restrictor can be placed along the line between the reservoir return port of the pilot check valve and the reservoir to provide a substantial resistance to fluid flow along the line, such as while the starter switch is actuated. Thus, when the vehicle is first started an additional pressure can be built up within the emergency and parking brake lines over and above the chosen pressure created by the operation of the pilot check valve.

A brake release hydraulic fluid reservoir can be fluidly coupled to the emergency and parking brake lines to provide a reservoir of high pressure hydraulic fluid sufficient to enable the brakes to be released while the engine is not running. This may be useful when the vehicle must be towed. This is accomplished by coupling the reservoir to the brake lines through two lines. The first line includes a check valve and is used to charge the reservoir. The second line is controlled by a user manipulated shutoff valve; the shutoff valve is opened when it is desired to charge the emergency and parking brake lines. Also, a separately powered (e.g. battery powered) auxiliary pump could be used to pressurize the emergency and parking brake lines when it is desired to release the brakes when the engine is not running.

In another embodiment, in which the vehicle does not have power steering but does have a hydraulic pump, such as a conventional power steering pump, the operator can reapply the brakes as follows. Although a control valve could be used, the control valve could be replaced by a T-coupling, one leg connected to the output port of the check valve, a second leg connected to the emergency and parking brake lines and a third leg connected to the reservoir. A user actuated shut-off valve would be placed along the line connecting the T-coupling to the reservoir. Opening the shut-off valve would allow the hydraulic fluid in the emergency and parking brake lines to be dumped into the reservoir regardless of the output from the power steering pump.

The invention provides for the application of mechanically powered brakes, as required for parking brake purposes, which are deactuated by hydraulic pressure. With the invention the operation of the conventional power steering components is essentially unchanged, even while providing true emergency and parking brakes for the vehicle. Since the deactuation of the mechanical brakes (typically by compressing brake springs) is accomplished by using hydraulic pressure, much stronger brake springs can be used for the emergency and parking brakes then would be possible using conventional manually applied brakes. With the present invention braking forces equal to those available with service brakes can be achieved thus providing true, full-force emergency and parking brakes for the vehicle.

Other features and advantages of the invention will appear from the following description in which the preferred embodiments have been set forth in detail in conjunction with the accompanying drawings.

BRIEF DESCRIPTION OF THE DRAWINGS

FIG. 1 is a schematic representation of a mechanical emergency and parking brake system of the invention as used on a vehicle.

FIG. 2 is a schematic representation of an alternative embodiment of the system of FIG. 1.

DETAILED DESCRIPTION OF THE PREFERRED EMBODIMENTS

FIG. 1 shows an emergency and parking brake system 2 used with a vehicle including an engine 4 which drives a power steering pump 6. Pump 6 includes a pump inlet 8 connected to a reservoir output 10 of a hydraulic fluid reservoir 12. Pump 6 also includes a pump outlet 14 coupled to a power steering gear 16 along a line 18, line 18 continuing to the reservoir inlet 20 of reservoir 12.

A governor 22 is positioned along line 18. Governor 22 includes a check valve 24 having an input port 26 connected to pump outlet 14 and an output port 28. Governor 22 also includes a pilot check valve 30 having an inlet port 32 connected to input port 26 and an outlet or reservoir return port 34 through which hydraulic fluid flows to power steering gear 16 along line 18.

Pilot check valve 30 includes a pilot port 36 connected to output port 28. The hydraulic fluid pressure at an output port 28 determines whether the flow path between inlet port 32 to return port 34 is open. Pilot check valve 30 is configured so that such flow path opens when the pressure at output port 28, and thus at pilot port 36 (at steady state conditions), reaches a chosen pressure. It should be noted that check valve 24 and pilot check valve 30 are conventional.

The pressure at pump outlet 14 is determined during normal use by the resistance to fluid flow created by power steering gear 16, which is dependent in large part upon how far the operator has turned the steering wheel. Therefore the pressure at input port 26 will vary during operation. Check valve 24, however, maintains the pressure at output port 28 according to the highest pressure which previously existed at input port 26.

If desired governor 22 can include a pressure release valve 38 connected to output port 28 at its release inlet 40 to allow pressure above a predetermined maximum pressure at output port 28 to be reduced. Pressure release valve 38 includes a release outlet 41 fluidly coupled to reservoir 12, as indicated by reference numeral A or to input port 26, as indicated by reference numeral B. When valve 38 is connected at reference numeral B, so that it is in parallel with check valve 24, the entire governor 22 is operationally similar to the governor shown in FIG. 2 in U.S. Pat. No. 4,440,189, the disclosure of which is incorporated by reference. Note that with that with the governor shown in U.S. Pat. No. 4,440,189, check valve 24 and pressure release valve 38 are incorporated into a single valve.

In the disclosed embodiment the vehicle has a pair of conventional front disc service brakes 42 actuated by conventional service brake hydraulic lines 44 and a pair off rear wheel drum brakes 46 also actuated by conventional hydraulic lines 48. To achieve full power emergency and parking brake force at the front wheels, mechanically actuated, hydraulically deactuated spring disc brakes 50 are used in conjunction with conventional disc brakes 42. For example, a spring disc brake 50 made by Minnesota Automotive, Inc. of Mankato, Minn. can be used. Spring disc brakes 50 each includes a disc brake port 52 which are coupled to a common emergency and parking (E & P) brake line 54 through an E & P brake lines 56, 58.

Drum brakes 46, essentially conventional in structure, are mechanically coupled by a pair of cables 60 to a cable puller 62. Cable puller 62 includes a plunger 64 biased to a brake on condition by a strong spring 66. Cable puller 62 includes a shoe brake port 68 fluidly coupled to common E & P brake line 54 through an E & P brake line 70.

Common E & P brake line 54 is fluidly connected to output port 28 through a two-way switch valve 72, shown in a brakes off position in FIG. 1. Switch valve 72 is controlled by the operator through an operator control 74, preferably within the vehicle. Switch valve 72 can be mechanically or electrically operated to switch between the brakes off position of FIG. 1 and a brakes on condition in which common E & P brake line 54 is connected to a dump line 76 connecting valve 72 to reservoir inlet 20. Placing switch valve 72 in the brakes on position allows pressurized hydraulic fluid within E & P brake lines 54, 56, 58 and 70, spring disc brakes 50 and cable puller 62 to drain into reservoir 20. Relieving the pressure within the E & P brake lines thus causes brakes 46 and 50 to be reapplied, typically for parking or during an emergency situation.

At times it is desirable to be able to release the brakes with the engine off. To permit this, a resiliently expandable brake release reservoir 78 is connected to E & P brake line 56 by a pair of lines 80, 82. Line 80 has a check valve 84 positioned along it which allows hydraulic fluid to enter brake release reservoir 78 but not to leave. Line 82 has a shutoff valve 86 positioned along it. When it is necessary to pressurize the E & P brake lines, shutoff valve 86 is opened allowing the hydraulic fluid within reservoir 78 to pressurize the E & P brake lines, spring disc brakes 50 and cable puller 62 thus releasing the brakes.

In some cases pilot check valve 30 may be constructed so that the chosen pressure at which the pilot check valve normally opens is lower than the pressure needed to deactuate brakes 50 or to actuate puller 62. This is not a problem if the user remembers to turn the steering wheel just after starting the engine so to increase the pressure at pump outlet 14 and thus at output port 28. To eliminate the need to turn the steeering wheel when the engine is first started, a flow restrictor 88 can be positioned along line 18 between return port 34 and reservoir inlet 20. Flow restrictor 88 is preferably coupled to the starter switch 90 of the vehicle so that restrictor 88 is actuated, thus substantially restricting the flow along line 18, only while the starter motor is operating. If, during this brief period of time, pilot check valve 30 opens, the flow through flow restrictor 88 is sufficiently restricted to create a substantial pressure within E & P brake lines 54, 56, 58 and 70. This may be especially advantageous to permit the rapid charging of expandable reservoir 78. Flow restrictor 88 may be constructed with a time delay to ensure that restrictor 88 remains actuated for a desired length of time, for example two seconds, even if starter switch 90 is released earlier.

In use, the user can start engine 4 with switch valve 72 in the brake off position of FIG. 1 or in the brake on position. If the former, and assuming flow restrictor 88 is used, substantially the entire volume of hydraulic fluid through line 18 is diverted through check valve 24 and into E & P brake lines 54, 56, 58 and 70, disc brakes 50 and cable puller 62 while restrictor valve 88 is actuated. Also, assuming brake release reservoir 78 is used, reservoir 78 is charged with hydraulic fluid during this time. After engine 4 starts, starter switch 90 is released to open flow restrictor 88 so that restrictor 88 no longer affects the operation of the system.

Assuming the pressure at output port 28 is above the chosen pressure, pilot check valve 30 is open allowing flow from inlet port 32 to return port 34, along line 18, through power steering gear 16, and finally to reservoir 12. If, however, during the initial charging of the system the pressure at output 28 is high enough to allow pressure release valve 38 to open, such excess pressure can be reduced through valve 38 either directly to reservoir 12 as indicated by reference letter A or to input port 26 as indicated by reference letter B. Assuming the B connection is used and assuming any overpressure at output port 28 is not caused by an overpressure at input port 26, connecting released outlet to input port 26 allows this overpressure to be reduced by dumping the excess fluid through pilot check valve 30, along line 18, through power steering gear 16 and to reservoir 12.

If an emergency occurs during driving so that is necessary to apply emergency brakes, such as if the service brakes fail, the operator actuates operator control 74 to place switch valve 72 to its brakes on condition. Doing so dumps the high pressure hydraulic fluid within the E & P brake lines to reservoir 12 thus allowing spring disc brakes 50 to be applied and allowing cable puller 62 to apply drum brakes 46. When switch valve 72 is in this position, pilot check valve 30 remains open so that provision of hydraulic fluid to power steering gear 16 is not affected. As a parking brake, the operator also places switch valve 72 in its brakes on position to apply the brakes.

Referring now to FIG. 2, an alternative embodiment of system 2 of FIG. 1 is shown. Like elements are identified with like reference characters. System 2 is similar to system 2 with the following main differences. The vehicle does not have a complete power steering system, but does have power steering pump 6 and reservoir 12. Lacing a power steering gear 16, there is no need for a flow restrictor 88. Instead of switch valve 72, lines 54 and 76 are connected at a tee 92 and a shut-off valve 94 along line 76 between tee 92 and reservoir 12. As with switch valve 72, shut-off valve 94 is controlled by operator control 74. When it is desired to apply brakes 46, 50, the user operates control 74 to open valve 94. This permits hydraulic fluid in lines 54, 56, 58 and 70 to flow into reservoir 12. Due to the relatively unimpeded pathway along line 76, continued operation of pump 6 after valve 94 has been opened will have minimal effect on the actuation of brakes 46, 50.

Modification and variation can be made to the disclosed embodiments without departing from the subject of the invention as defined in the following claims. For example, when the present invention is used with vehicles not having power steering, sources of pressurized hydraulic fluid other than power steering pumps can be used. The preferred embodiments have been shown with both discs and drum brakes. The invention is, however, not limited to this or other particular brake types or configurations.

I claim:

1. A mechanical emergency and parking brake system for vehicles of the type having a hydraulic fluid pump, the pump having a pump inlet coupled to the reservoir outlet of a hydraulic fluid reservoir and a pump outlet coupled to the reservoir inlet of the reservoir, the system comprising:
   a check valve having an input port, coupled to the pump outlet, and an output port and configured to permit fluid flow from the input port to the output port and to restrict fluid flow from the output port to the input port;
   a pilot check valve including an inlet port connected to the input port, a return port coupled to the reservoir inlet and a pilot port fluidly coupled to the output port, the pilot check valve configured to prevent fluid flow from the inlet port to the return port when the pressure at the pilot port is below a first chosen value and to permit fluid flow from the inlet port to the return port when the pressure at the pilot port is above a second chosen value;
   a mechanically actuated, fluid pressure released brake including a brake port connected to the output port, whereby the brake is released upon application of fluid pressure to the brake port; and
   a user actuated valve operable to fluidly couple the brake port to the reservoir inlet to allow the brake to be actuated.

2. The brake system of claim 1 wherein the check valve includes a spring biased, fluid flow blocking element.

3. The brake system of claim 1 further comprising a pressure release element fluidly coupled to the output port to limit the pressure at the output port to a limit pressure.

4. The brake system of claim 3 wherein the pressure release element and the check valve are combined to form a check relief valve.

5. The brake system of claim 3 wherein the pressure release element fluidly couples the output port to the input port.

6. The brake system of claim 3 wherein the pressure release element includes a pressure release valve fluidly coupling the output port to the reservoir inlet.

7. The brake system of claim 1 wherein the first and second chosen values are about equal.

8. The brake system of claim 1 further comprising a flow restrictor fluidly coupled along a line between the return port and the reservoir inlet, the flow restrictor operable to restrict flow along the line while the flow restrictor is actuated.

9. The brake system of claim 8 wherein the flow restrictor is remotely actuated.

10. The brake system of claim 8 wherein the flow restrictor is operably coupled to a starter switch so that the flow restrictor temporarily restricts flow along the line upon actuation of the starter switch.

11. The brake system of claim 8 wherein the flow restrictor is configured to restrict flow along the line only while the starter switch is actuated.

12. The brake system of claim 1 wherein the user actuated valve couples the brake port to the reservoir inlet when in a brake on position and blocks fluid flow from the brake port to the reservoir when in a brake off position.

13. The brake system of claim 12 wherein the user actuated valve couples the brake port to the output port when in a brakes off position.

14. The brake system of claim 12 wherein the brake port remains coupled to the output port regardless of the position of the user actuated valve.

15. The brake system of claim 1 wherein the brake includes first and second disc brakes.

16. The brake system of claim 1 wherein the brake includes first and second drum brakes mechanically coupled to a spring powered mechanical actuator, the mechanical actuator including a fluid powered deactuator which acts to deactuate the mechanical actuator upon application of fluid pressure to the deactuator.

17. A mechanical emergency and parking brake system for vehicles of the type having a power steering pump, a power steering gear and a power steering fluid reservoir, the pump having a pump inlet coupled to a reservoir outlet of the reservoir and a pump outlet coupled to the power steering gear, the power steering gear being fluidly positioned along a line between the pump outlet and a reservoir inlet of the reservoir, the system comprising:

a check valve having an input port, coupled to the pump outlet, and an output port and configured to permit fluid flow from the input port to the output port and to restrict fluid flow from the output port to the input port;

a pilot check valve including an inlet port connected to the input port, a return port coupled to the power steering gear and a pilot port fluidly coupled to the output port, the pilot check valve configured to prevent fluid flow from the inlet port to the return port when the pressure at the pilot port is below a chosen value and to permit fluid flow from the inlet port to the return port when the pressure at the pilot port is above the chosen value;

the check valve including a pressure release element fluidly coupling the output port to the input port to limit the pressure at the output port to a limit pressure;

a flow restrictor fluidly coupled along the line in the region between the return port and the reservoir inlet, the flow restrictor operably coupled to a starter switch to temporarily restrict flow along the line after the starter switch is actuated;

a spring actuated, fluid pressure released brake including a brake port connected to the output port, whereby the brake is released upon application of fluid pressure to the brake port; and a user actuated valve operable to fluidly couple the brake port to the reservoir inlet to allow the spring actuated, fluid pressure released brake to actuate.

18. A mechanical emergency and parking brake system for vehicles comprising:

a hydraulic fluid pump;

a hydraulic fluid reservoir having a reservoir inlet and a reservoir outlet;

the pump having a pump inlet coupled to a reservoir outlet and a pump outlet coupled to a line between the pump outlet and the reservoir inlet;

a governor including:
　a check valve having an input port, coupled to the pump outlet, and an output port and configured to permit fluid flow from the input port to the output port and to restrict fluid flow from the output port to the input port;
　a pilot check valve including an inlet port connected to the input port, a return port coupled to the reservoir and a pilot port fluidly coupled to the output port, the pilot check valve configured to prevent fluid flow from the inlet port to the return port when the pressure at the pilot port is below a chosen value and to permit fluid flow from the inlet port to the return port when the pressure at the pilot port is above the chosen value; and
　the check valve including a pressure release element fluidly coupling to the output port to the input port to limit the pressure at the output port to a limit pressure;

a spring actuated, fluid pressure released brake including a brake port connected to the output port, whereby the brake is released upon application of fluid pressure to the brake port; and a user actuated valve operable to fluidly couple the brake port to the reservoir inlet to allow the spring actuated, fluid pressure released brake to actuate.

* * * * *